Nov. 24, 1953          H. L. BOWDITCH          2,660,147
DETACHABLE INDEX ARM UNIT FOR MEASURING INSTRUMENTS
Filed Sept. 2, 1952          2 Sheets-Sheet 1
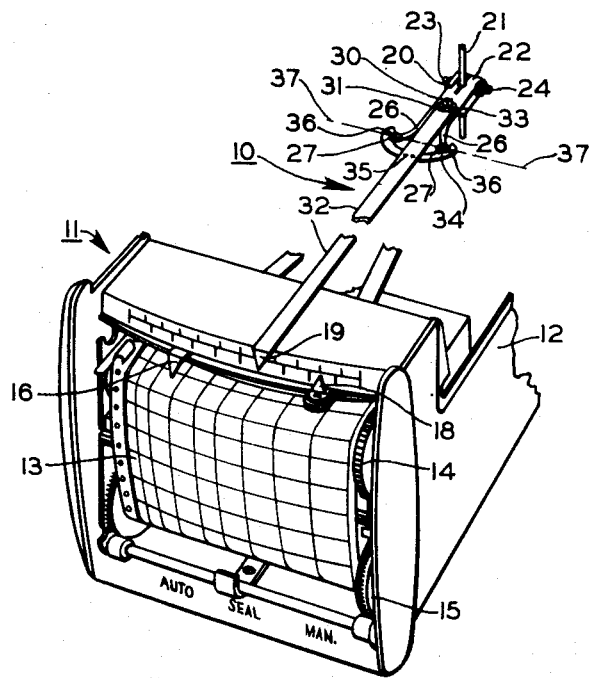
FIG. I
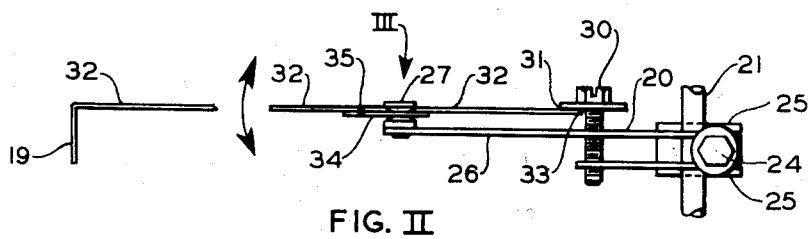
FIG. II
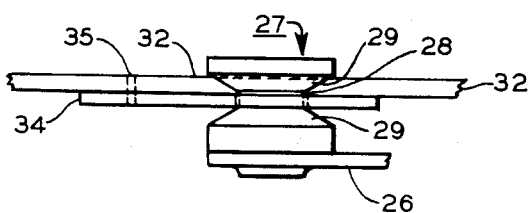
FIG. III
INVENTOR.
HOEL L. BOWDITCH
BY
Curtis, Morris & Safford
ATTORNEYS Nov. 24, 1953 H. L. BOWDITCH 2,660,147
DETACHABLE INDEX ARM UNIT FOR MEASURING INSTRUMENTS
Filed Sept. 2, 1952 2 Sheets-Sheet 2
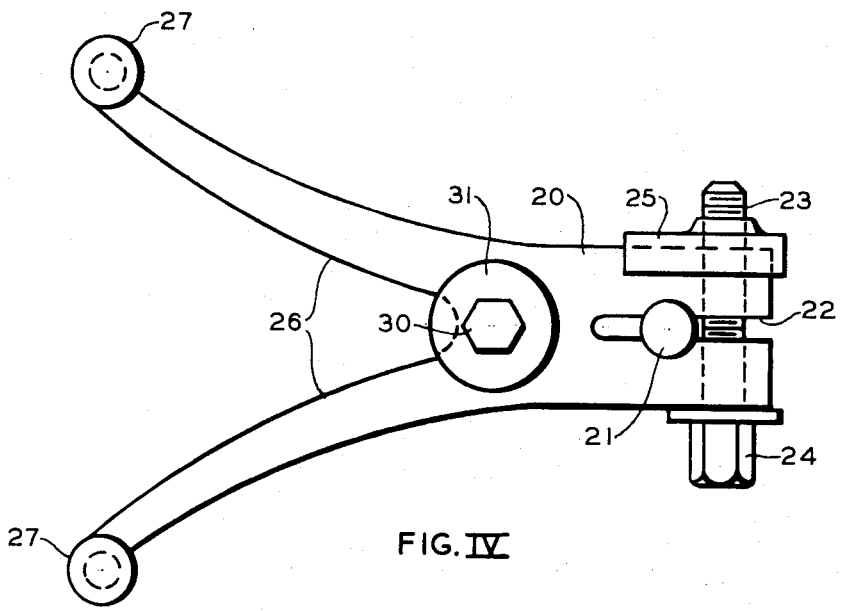
FIG. IV
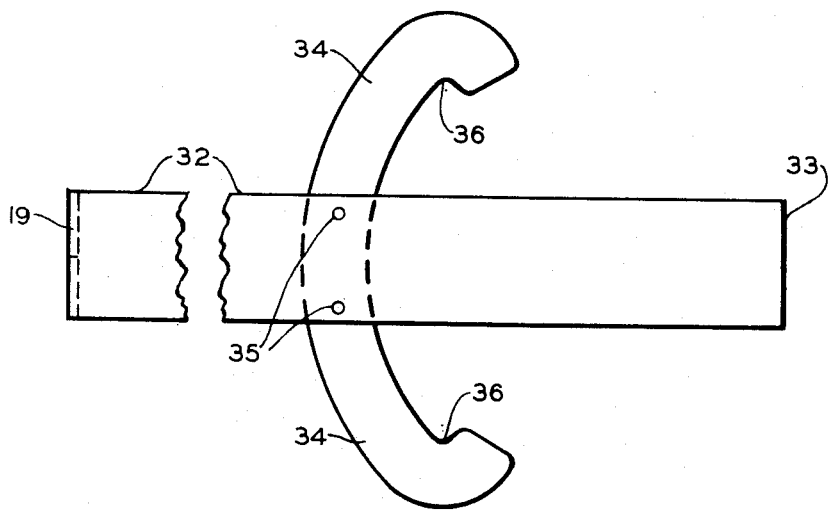
FIG. V
INVENTOR.
HOEL L. BOWDITCH
BY
Curtis, Morris + Safford
ATTORNEYS Patented Nov. 24, 1953

2,660,147

UNITED STATES PATENT OFFICE 2,660,147

DETACHABLE INDEX ARM UNIT FOR MEASURING INSTRUMENTS

Hoel L. Bowditch, Foxboro, Mass., assignor to The Foxboro Company, Foxboro, Mass., a corporation of Massachusetts Application September 2, 1952, Serial No. 307,545

1 Claim. (Cl. 116—136.5)

This invention relates to measuring instruments wherein an index arm unit is driven in relation to changes in a variable condition. In particular, this invention relates to a new and improved index arm unit, for example, a pointer, a set arm, or a pen arm, for such instruments.

In industrial instruments especially, it is desirable to use lightweight and delicate driving and driven elements in order to accurately measure small power responses to changes in variable conditions.

In some instruments it is desirable to reduce the frontal face size of the instruments in order to more efficiently use multi-instrument panel space. One method of so reducing face size is to give the instrument substantial depth, and this arrangement may necessitate the use of extra long index arms, driven from the rear of the instrument. Such arms must be even more lightweight and delicate than previous, shorter arms in order to be as small a burden on the instrument as possible.

A problem in instrument structures is that index arms need to be easy to assemble in the manufacture of such instruments, and the arms may need to be repaired or replaced, and it is important for index arm structures and arrangements to be capable of ready assembly or disassembly. The assembly of the index arms must be sufficiently strongly held together to insure definiteness and duplication of alignment and of operative dimension when disassembled and replaced or reassembled.

In order to provide ready assembly and disassembly of the index arms, some form of snap action structure is preferable. However, since the assembly must be strongly held together, a substantial force is necessary to disengage or engage the snap action assembly. This problem is aggravated in instruments of the type previously mentioned by the fact that extra long index arms need to be extra lightweight and delicate. The application of substantial force to such arms in the act of assembling or disassembling them with respect to the instrument is very liable to materially deform or otherwise damage the index arms.

Such extra long index arms are usually made of thin strip stock, and even though they may be reinforced by longitudinal ridges or like formations, they are still delicate in relation to the force necessary to assemble or disassemble them with respect to the instrument.

This invention provides index arm structures with snap action assembly arrangements to which substantial force may be applied to accomplish assembly and disassembly thereof. This is accomplished by providing index arm structures which may be snapped in or out of assembly with the instrument by applying force transversely of the index arm, that is, in the direction of the greatest strength of the arm.

It is therefore an object of this invention to provide new and improved measuring instrument index arm arrangements for snap action assembly and disassembly with respect to strongly held assemblies wherein the index arms are unusually long, lightweight, and delicate.

Another object is to provide a snap action connection arrangement for a measuring instrument index arm in which the snap action connection is used primarily to locate and hold the assembled parts strongly together, and other means is used to provide substantial support for the index arm.

These and other objects of this invention will be in part pointed out and will be in part obvious from the text and claim here presented, and from the accompanying drawings, in which:

Figure I is a fragmentary perspective showing of a measuring instrument incorporating an index arm unit embodying this invention;

Figure II is a side elevation of the index arm unit of Figure I;

Figure III is an enlargement of a portion of the structure of Figure II, as indicated in Figure II by the numeral III;

Figure IV is a plan view of one separable portion of the index arm unit of Figures I, II, and III; and Figure V is a plan view of another separable portion of the index arm unit of Figures I, II, and III.

Referring to Figure I, an index arm unit 10 is shown in association with a measuring instrument portion 11. The position of the index arm unit 10 indicates the value of a factor that varies as an incident of the operation of the instrument, for example, valve position in a flow control arrangement. The instrument portion 11 is contained in a housing 12 with a strip chart 13 mounted therein on rollers 14 and 15 to be driven in association with a recording pen 16 for recording the measurement action of the instrument. This instrument is shown simply for the purpose of showing a typical application of the index arm unit 10. The details of the instrument are therefore not shown. Any of the usual strip chart recording structures may be used for this purpose. However, the index arm unit 10 is shown broken to indicate substantial length, greater than usual in measuring instrument index arms. This extra long index arm unit is an indication that one application of the index arm unit of this invention is its use in an instrument where the frontal face size is reduced by giving the instrument substantial depth. Desirable instrument design in such a case may dictate that the index arm units be driven from the rear of the instrument, thus requiring extra long, extra lightweight index arm units.

The instrument portion 11 is shown with a double index scale block 17 mounted above the strip chart 13, and a control set point indicator 18 is arranged in association with one of the index scales on the block 17. The index arm unit 10 has a free end pointer portion 19 associated with the other index scale on the block 17.

The index arm unit 10 has a driven base or stub portion 20 which is secured to a rotatable shaft 21. The shaft 21 is driven by any suitable means, not shown, in response to changes in a variable condition. The driven shaft 21 is shown in a vertical position with the index arm unit 10 movable in a horizontal plane thereby. The index arm stub 20 is generally in the form of a flat strip with one end bent in a U formation with the shaft 21 extending vertically through both legs of the U formation. As a means of clamping the stub 20 to the shaft 21, the U formation is slotted as at 22 through the base of the U to connect with both of the shaft receiving openings in the U formation. A clamp bolt 23 is provided with a head 24 bearing on one edge of the U formation. The bolt 23 extends between the legs of the U formation and between the shaft 21 and the base of the U. As may be seen in Figure IV, the bolt 23 is threaded into a cover plate 25 on the opposing edge of the U formation. Thus as the bolt 23 is tightened the slot 23 is narrowed and the stub 20 is clamped to the shaft 21.

Still referring to Figure IV, the stub 20 is provided with a pair of connector legs 26. These legs extend generally in the direction of the longitudinal axis of the index arm unit in straddling relation with respect to that axis. These legs, further, terminate in end portions arranged transversely of the index arm unit and laterally spaced from the main body of the unit. The connector legs are formed with a degree of resiliency for small movements toward and away from each other. Duplicate connector capstans 27 are mounted on the outer ends of the connector legs 26. As shown in Figure III, the capstans 27 are each formed with a central, reduced diameter, cylindrical portion 28 and with frusto-conical ends 29 in tapering enlargement from the cylindrical portion 28.

Referring again to the stub 20, and to Figures I, II, and IV, an adjustment bolt 30 is provided. This bolt is mounted in vertical threaded relation with the stub 20, and extends through both sides of the U formation of the stub 20. The bolt 30 is located on the longitudinal axis of the index arm unit, and in the stub 20 at a point adjacent the junction of the connector legs 26. This adjustment bolt has a spool-like member 31 secured to the under side of the head of the bolt, and concentric therewith, which is used as a factor in the assembly of the index arm unit 10, as will be explained later herein.

Referring to Figures I and V, an index arm 32 is provided for separable assembly with the stub 20, with this assembly forming the complete index arm unit 10. The index arm 32 has an elongated, lightweight flat strip as a main body, with the pointer formation 19 at the outer end of this body, and an inner, butt end 33 as the driven and assembly end of the main body. A rigid, flat strip connector crosspiece 34 is secured, flat to flat, to the main body of the index arm 32 at a point on that arm adjacent its butt end portion 33. The midportion of the crosspiece is fixed to the index arm 32 by a pair of rivets 35. The configuration of the crosspiece is generally in the form of a C, facing the butt end of the index arm. Each end of the crosspiece 34 is provided with a curved portion 36 for receiving the capstans 27 of the stub 20 in assembled relation. The curved portions 36 are duplicates and substantially semi-cylinders, vertically disposed, and with their open sides facing inwardly toward the main body of the index arm 32. The radii of the cylinder portions 36 are somewhat greater than the radii of the central cylindrical portions 28 of the capstans 27. Further, the thickness of the crosspiece 34 is somewhat less than the length of the central cylindrical portion 28 of the capstans 27. Lastly, the distance between the centers of the curved portions 36 is established as somewhat less than the distance between the centers of the capstans 27 in the unrestricted, unassembled condition of the stub 20 and its connector legs 26.

The above structural details simply mean that the index arm 32 and the stub 20 are detachably connectable in a snap action assembly, through the assembly of the index arm crosspiece 34 with the stub capstans 27, by means of the containment of the capstans in the crosspiece cylindrical portions 28. When the index arm and stub are so assembled, the resilient stub connector legs 26 are under constriction toward each other because the spacing of the crosspiece portions 28 is somewhat less than the unrestricted spacing of the capstans 27. Assembly and disassembly is accomplished by applying manual force transversely of the index arm, that is, laterally of the index arm as a whole. To assemble, one of the capstans 27 is placed in its associated crosspiece cylindrical portion, and the other capstan is snapped into place in the other crosspiece cylindrical portion by forcing the crosspiece about the first capstan as a pivot and constricting the stub connector legs 26 by camming pressure on the second capstan by the crosspiece. This arrangement strongly holds the index arm and stub together and insures definiteness and duplication of alignment and of operative dimension when disassembled and replaced or reassembled.

In the assembly of the index arm 32 and the stub 20, the index arm is in effect pivoted on the stub about an axis generally indicated in Figure I by the axis line 37. The crosspiece connections to the capstans 27 provide this effective pivot arrangement because the crosspiece thickness is somewhat less than the length of the capstan cylinder 28 and because the crosspiece cylindrical configurations 36 have radii somewhat greater than the radii of the capstan cylinder 28. Thus the index arm is driven in a horizontal plane at right angles to the drive shaft 21, and in addition, the index arm is pivotable in a vertical plane.

In the assembly of the index arm 32 and the stub 20, the index arm butt end 33 is located between the ends of the adjustment spool 31, and is in upwardly biased engagement with the top end of the spool. This upward bias is provided by the pull gravity on the elongated index arm portion on the opposite side of the index arm pivot axis 37. The index arm pointer 19 may thus be lifted against gravity within the limits provided by the spool ends, while its downward movement is limited by the positive stop action of the adjustment bolt 30. The index arm is flexible and will bend down somewhat because of this factor, even though it is in engagement with a positive stop at its butt end. The spool ends may be separated by whatever distance is preferred for free pivotal movement of the index arm.

In the arrangement shown, the index arm may be pivoted in a vertical plane to move the indicator point 19 upwards by adjusting the bolt 30 downwards. This action may be used to lift the point 19 or simply to reduce the effect of gravity on the index arm. In some instances it may be desirable to add to the gravital effect by adjusting the bolt 30 upwards. This adjustment will result in the index arm indicator point moving downward until the index arm engages some part of the instrument. Further upward adjustment of the bolt 30 would then result in increased pressure in this index arm engagement. With an index arm in the form of a pen arm, this arrangement would be found useful to vary the pen pressure on a recording surface. In other arrangements, for example where the index arm pivot axis 37 is vertical, the adjustment bolt 30 may still be used for positioning or variable pressure application of a pen or other index arm arrangement. Similarly, the arrangement is effective where the pivot axis 37 is horizontal and the index arm general disposition is vertical.

For the purposes of this invention, that is, the provision of a detachable index arm, the adjustment bolt 30 may be a fixed, headed pin, with the index arm butt end 33 engaging the under side of the head of the pin.

This invention, therefore provides a novel measuring instrument index arm and index arm separable assembly.

As many embodiments may be made in the above invention, and as many changes may be made in the embodiment above described without departing from the spirit and scope of the invention as described herein and shown in the accompanying drawings, it is to be understood that all matter hereinbefore set forth or shown in the accompanying drawings is to be interpreted as illustrative only and not in a limiting sense.

I claim:

In a measuring instrument, a two part index arm unit comprising, in combination, a driven stub and an arm detachably secured thereto in a snap fastener arrangement, said stub having a pair of oppositely and laterally extending resilient arms and a connection capstan on each of said arms, and said index arm having a crosspiece secured thereto and capstan receiving configurations on said crosspiece, with said resilient arms biased to hold said capstans in said configurations to provide said snap fastener arrangement.

HOEL L. BOWDITCH.

References Cited in the file of this patent

UNITED STATES PATENTS

| Number | Name | Date |
| --- | --- | --- |
| 1,906,514 | Beck | May 2, 1933 |